United States Patent
Mori et al.

(10) Patent No.: US 10,454,396 B2
(45) Date of Patent: Oct. 22, 2019

(54) POLYPHASE ELECTRIC MOTOR CONTROL DEVICE

(71) Applicants: Yoji Mori, Aichi (JP); Taku Ogasawara, Aichi (JP); Satoshi Doba, Aichi (JP)

(72) Inventors: Yoji Mori, Aichi (JP); Taku Ogasawara, Aichi (JP); Satoshi Doba, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 14 days.

(21) Appl. No.: 15/951,711

(22) Filed: Apr. 12, 2018

(65) Prior Publication Data

US 2018/0302008 A1    Oct. 18, 2018

(30) Foreign Application Priority Data

Apr. 12, 2017  (JP) .................................. 2017-078868

(51) Int. Cl.
*H02P 6/15* (2016.01)
*H02P 27/08* (2006.01)

(52) U.S. Cl.
CPC ................ *H02P 6/15* (2016.02); *H02P 27/08* (2013.01); *H02P 27/085* (2013.01)

(58) Field of Classification Search
CPC .................................. H02P 6/15; H02P 27/085
See application file for complete search history.

(56) References Cited

U.S. PATENT DOCUMENTS

2012/0118662 A1* 5/2012 Sakai .................... B62D 5/046
                                                             180/443
2016/0352269 A1* 12/2016 Takahashi ............. H02P 27/085

FOREIGN PATENT DOCUMENTS

JP        2010-220414 A        9/2010

* cited by examiner

*Primary Examiner* — Kawing Chan
*Assistant Examiner* — Bradley R Brown
(74) *Attorney, Agent, or Firm* — Osha Liang LLP

(57) ABSTRACT

A polyphase electric motor control device stores a first threshold as a duty cycle at which noise caused by a high potential-side switching element starts to overlap a first measurement period, and a second threshold as a duty cycle at which time when a low potential-side switching element is switched from on to off is after an end of a second measurement period, makes a first judgment for comparing a maximum target duty cycle with the first threshold, and a second judgment for comparing a second greatest target duty cycle with the second threshold, measures a current in the first measurement period when the maximum target duty cycle is smaller than the first threshold, and measures a current in the second measurement period when the maximum target duty cycle is greater than the first threshold and the second greatest target duty cycle is smaller than the second threshold.

5 Claims, 13 Drawing Sheets

FIG. 13A
FIG. 13B
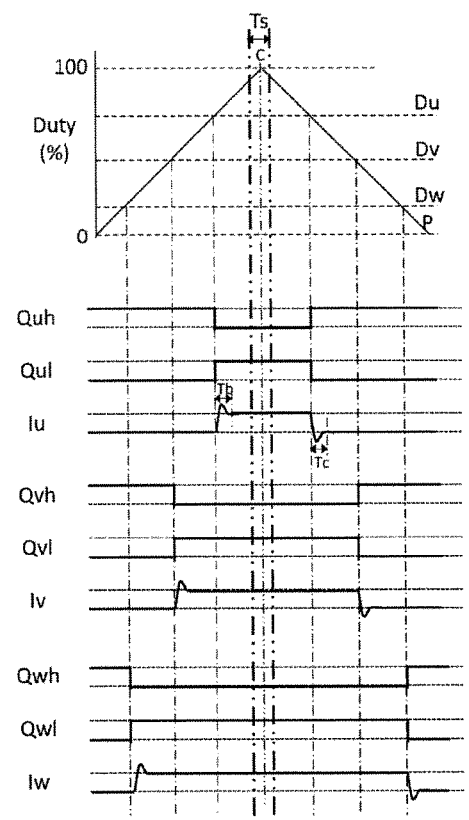
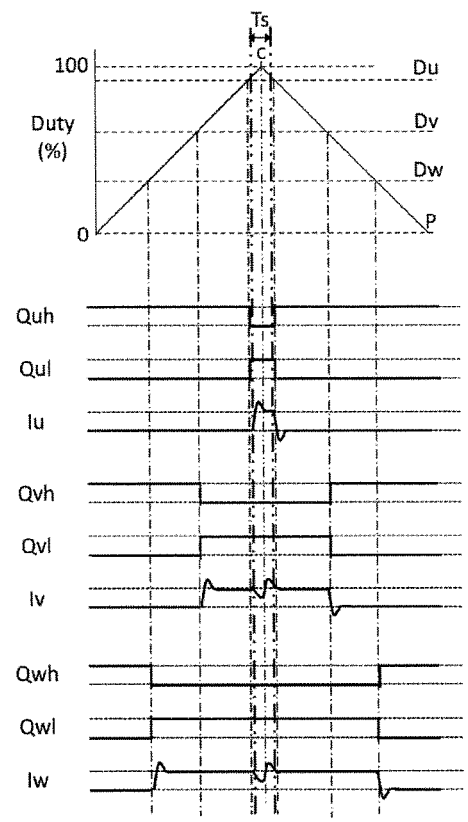

POLYPHASE ELECTRIC MOTOR CONTROL DEVICE

CROSS-REFERENCE TO RELATED APPLICATION

This application is based on Japanese Patent Application No. 2017-078868 filed with the Japan Patent Office on Apr. 12, 2017, the entire contents of which are incorporated herein by reference.

FIELD

The disclosure relates to a polyphase electric motor control device.

BACKGROUND

Conventionally, there has been known a technique of detecting a phase current value of each phase with high precision in order to control a switching element of a bridge circuit that drives a polyphase electric motor to rotate, by using PWM control. For example, JP 2010-220414 A discloses a motor control device capable of ensuring highly accurate current detection. In a case where an on time of one of the low potential-side switching elements corresponding to each phase in a driving circuit becomes shorter than a current-value detection time, the motor control device estimates a phase current value of a current undetectable phase corresponding to the one of the switching elements. The motor control device estimates the phase current value of the current undetectable phase according to current values of two phases other than the current undetectable phase. Upon current detection according to the above-described estimation, the motor control device holds the switching state of the switching arm corresponding to the current undetectable phase during current detection with respect to the two phases other than the current undetectable phase which are bases for the estimation. In other words, the motor control device causes a high potential-side switching element to be turned on and the low potential-side switching element to be turned off, and thus outputs a motor control signal that prevents mixing of noise caused by switching of the switching element. Therefore, the motor control device can ensure highly accurate current detection even though an output voltage limit set for securing detection time of the phase current value in all the phases is eliminated.

SUMMARY

The disclosure provides a polyphase electric motor control device that measures a phase current while reducing the influence of noise generated upon switching of a switching element.

In order to solve the above-described problem, a polyphase electric motor control device is provided which controls a polyphase electric motor. The polyphase electric motor control device includes: a bridge circuit configured by connecting in parallel phase circuits corresponding to each phase of the polyphase electric motor, each of the phase circuits including in series a high potential-side switching element, a low potential-side switching element, and a current detector provided on a low-potential side with respect to the low potential-side switching element and configured to detect a phase current value; a controller configured to measure a current flowing through each current detector in a first measurement period or in a second measurement period in which measurement is started later than the first measurement period and configured to calculate a control signal for controlling a current fed to each of the phase circuits; and a PWM controller configured to periodically calculate a target duty cycle of a PWM signal for driving each of the low potential-side switching element and the high potential-side switching element, the target duty cycle being calculated according to the control signal. The controller is configured to store a first threshold which is a duty cycle at which switching noise caused by the high potential-side switching element of the phase circuit starts to overlap the first measurement period, and a second threshold which is a duty cycle at which time when the low potential-side switching element of the phase circuit is switched from on to off is after an end of the second measurement period. The controller is configured to make a first judgment for comparing a maximum target duty cycle among the target duty cycles with the first threshold and a second judgment for comparing a second greatest target duty cycle among the target duty cycles with the second threshold. When a result of the first judgment indicates that the maximum target duty cycle is smaller than the first threshold, the controller measures the current in the first measurement period. When a result of the first judgment indicates that the maximum target duty cycle is greater than the first threshold and a result of the second judgment indicates that the second greatest target duty cycle is smaller than the second threshold, the controller measures the current in the second measurement period.

According to this, by measuring the current flowing through the phase circuit while avoiding noise generated in the phase circuit having the second greatest duty cycle, the noise being generated due to switching of the switching element in the phase circuit having the maximum duty cycle, it is possible to provide a polyphase electric motor control device that measures a phase current while reducing the influence of noise generated upon switching of the switching element.

The start time of the second measurement period may be a time point at which noise converges, the noise being generated upon switching from off to on of the high potential-side switching element of the phase circuit when the phase circuit is driven at the duty cycle of the first threshold.

According to this, by setting the start time of the second measurement period to the time point at which the noise generated upon switching from off to on of the high potential-side switching element converges, the second threshold can be minimized. Therefore, it is possible to maximize an intermediate duty range in which a current can be measured in the second measurement period without overlapping noise. The intermediate duty range is time during which the low potential-side switching element of the phase circuit having the second greatest duty cycle is turned on.

Furthermore, the start time of the first measurement period may be delayed by a predetermined delay time from the center of the PWM signal.

According to this, even if the noise is slightly behind a change in the PWM signal, overlapping of noise can be avoided.

In order to solve the above-described problem, a polyphase electric motor control device is provided which controls a polyphase electric motor. The polyphase electric motor control device includes: a bridge circuit configured by connecting in parallel phase circuits corresponding to each phase of the polyphase electric motor, each of the phase circuits including in series a high potential-side switching element, a low potential-side switching element, and a current detector provided on a low-potential side with respect to the low potential-side switching element and configured to detect a phase current value; a controller configured to measure a current flowing through each current detector in a first measurement period or in a second measurement period in which measurement is started later than the first measurement period and configured to calculate a control signal for controlling a current fed to each of the phase circuits; and a PWM controller configured to periodically calculate a target duty cycle of a PWM signal for driving each of the low potential-side switching element and the high potential-side switching element, the target duty cycle being calculated according to the control signal. The controller is configured to store a first threshold which is an off time of the high potential-side switching element of the phase circuit having the maximum target duty cycle among the target duty cycles in a case where switching noise caused by the high potential-side switching element of the phase circuit having the maximum target duty cycle starts to overlap the first measurement period, and a second threshold which is an on time of the low potential-side switching element of the phase circuit having the second greatest target duty cycle among the target duty cycles in a case where the low potential-side switching element of the phase circuit having the second greatest target duty cycle is switched from on to off is after an end of the second measurement period. The controller is configured to make a first judgment for comparing the off time of the high potential-side switching element of the phase circuit having the maximum target duty cycle with the first threshold, and a second judgment for comparing the on time of the low potential-side switching element of the phase circuit having the second greatest target duty cycle with the second threshold. When a result of the first judgment indicates that the off time of the high potential-side switching element of the phase circuit having the maximum target duty cycle is greater than or equal to the first threshold, the controller measures the current in the first measurement period. When a result of the first judgment indicates that the off time of the high potential-side switching element of the phase circuit having the maximum target duty cycle is smaller than the first threshold and a result of the second judgment indicates that the on time of the low potential-side switching element of the phase circuit having the second greatest target duty cycle is greater than the second threshold, the controller measures the current in the second measurement period.

According to this, by measuring the current flowing through the phase circuit while avoiding noise generated in the phase circuit having the second greatest duty cycle, the noise being generated due to switching of the switching element in the phase circuit having the maximum duty cycle, it is possible to provide a polyphase electric motor control device that measures a phase current while reducing the influence of noise generated upon switching of the switching element.

According to the disclosure, it is possible to provide a polyphase electric motor control device that measures a phase current while reducing the influence of noise generated upon switching of a switching element.

BRIEF DESCRIPTION OF THE DRAWINGS

FIG. 13A is an explanatory diagram for explaining a current detecting method in a case where time in which all of the low potential-side switching elements are turned on is sufficiently longer than current detection time in a polyphase electric motor control device. FIG. 13B is an explanatory diagram for explaining a current detecting method in a case where the time in which all the low potential-side switching elements are turned on is substantially identical to the current detection time in the polyphase electric motor control device.

DETAILED DESCRIPTION

Figure 1:
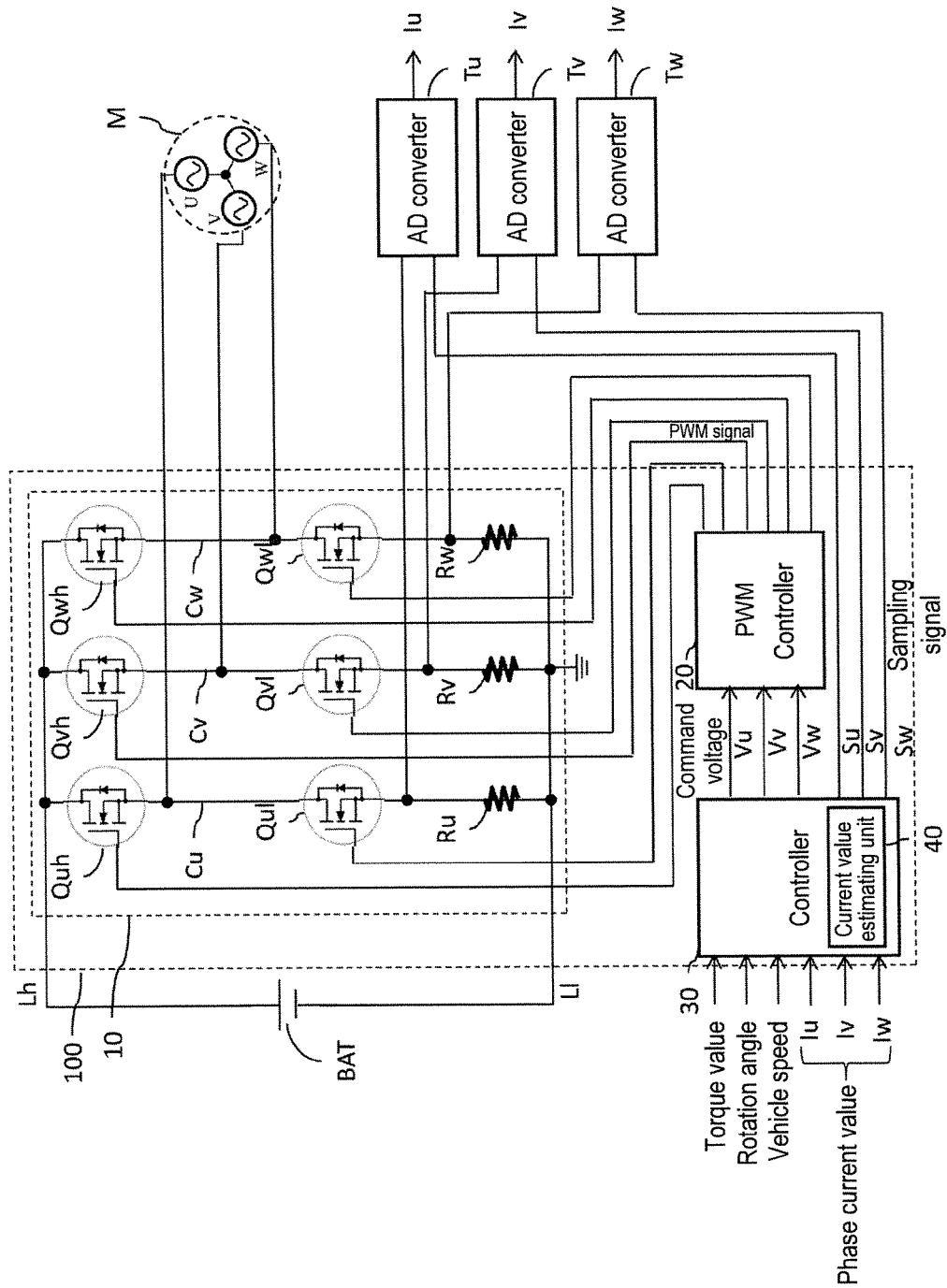
FIG. 1 is a block diagram of a polyphase electric motor control device according to one or more embodiments of the disclosure.

Each embodiment will be described below with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First Embodiment

With reference to FIG. 1, a polyphase electric motor control device 100 according to this embodiment will be described. The polyphase electric motor control device 100 drives and controls a three-phase electric motor M. The three-phase electric motor M is three-phase brushless motor used for an electric power steering device (not illustrated) of a vehicle or the like, and gives an assist force to a steering operation. The polyphase electric motor control device 100 includes a bridge circuit 10, a pulse width modulation (PWM) controller 20, and a controller 30. The bridge circuit 10 is configured by connecting in parallel phase circuits Cu, Cv, Cw corresponding to phases U, V, W of the three-phase electric motor M, respectively. The PWM controller 20 outputs a PWM signal to each phase of the bridge circuit 10. The controller 30 controls entirety of the polyphase electric motor control device 100.

The bridge circuit 10 is connected to a positive-electrode side of a battery BAT via a power supply line Lh and is connected (grounded) to a negative-electrode side of the battery BAT via a ground line Ll. The phase circuits Cu, Cv, Cw of the bridge circuit 10 include high potential-side switching elements Quh, Qvh, Qwh, low potential-side switching elements Qul, Qvl, Qwl, and current detectors Ru, Rv, Rw, respectively. Each of the high potential-side switching elements Quh, Qvh, Qwh is provided on a power supply line Lh side. Each of the low potential-side switching elements Qul, Qvl, Qwl is provided on a ground line Ll side. Each of the current detectors Ru, Rv, Rw is provided closest to the ground line Ll. The high potential-side switching elements Quh, Qvh, Qwh, the low potential-side switching elements Qul, Qvl, Qwl, and the current detectors Ru, Rv, Rw are connected in series, respectively. In the embodiment, a MOSFET, that is, a metal-oxide-semiconductor field-effect transistor is used as each of the high potential-side switching elements Quh, Qvh, Qwh and the low potential-side switching elements Qul, Qvl, Qwl.

The drain of each of the high potential-side switching elements Quh, Qvh, Qwh is connected to the power supply line Lh. The sources of the high potential-side switching elements Quh, Qvh, Qwh are connected to the drains of the low potential-side switching elements Qul, Qvl, Qwl, respectively. The sources of the low potential-side switching elements Qul, Qvl, Qwl are connected to the ground line Ll via the current detectors Ru, Rv, Rw, respectively. A PWM signal generated by the PWM controller 20 is input to the gate of each of the high potential-side switching elements Quh, Qvh, Qwh and the low potential-side switching elements Qul, Qvl, Qwl and thus the source and the drain are connected to or disconnected from each other.

The current detectors Ru, Rv, Rw are resistors (shunt resistors) for current detection and are provided on the lower potential side (ground side) with respect to the low potential-side switching elements Qul, Qvl, Qwl. The current detectors Ru, Rv, Rw detect currents supplied from the bridge circuit 10 to the phases U, V, W of the three-phase electric motor M by using a method to be described later. Normally, the three-phase electric motor M of the electric power steering device is subjected to sine wave energization, and thus drive power is supplied to the three-phase electric motor M. At that time, feedback of the current value of each phase U, V, W is required. Therefore, the current detectors Ru, Rv, Rw are provided in the phase circuits Cu, Cv, Cw, respectively, in order to detect the current of each phase.

Connecting points between the high potential-side switching elements Quh, Qvh, Qwh and the low potential-side switching elements Qul, Qvl, Qwl are connected to coils of the phases U, V, W of the three-phase electric motor M, respectively. In addition, connecting points between the low potential-side switching elements Qul, Qvl, Qwl and the current detectors Ru, Rv, Rw are connected to AD converters Tu, Tv, Tw. The AD converters Tu, Tv, Tw output phase current values Iu, Iv, Iw, respectively, obtained by converting analog phase current values of the phase circuits Cu, Cv, Cw into digital values.

Voltage values corresponding to the phase current values Iu, Iv, Iw output from the AD converters Tu, Tv, Tw, a steering torque value of steering obtained from another sensor or an electric control unit (ECU, not illustrated), a rotation angle (electrical angle) of the three-phase electric motor M, and vehicle speed are input to the controller 30. According to the steering torque value given to steering by a driver at that vehicle speed, the rotation angle, and the phase current values Iu, Iv, Iw detected by the AD converters Tu, Tv, Tw, the controller 30 calculates as control signals command voltages Vu, Vv, Vw for the respective phases, the command voltages Vu, Vv, Vw corresponding to a target value of the assist force that the three-phase electric motor M gives to steering. Then, the controller 30 outputs the command voltages Vu, Vv, Vw to the PWM controller 20. Note that the controller 30 is configured with a microcomputer including a CPU and a memory.

The PWM controller 20 generates duty instruction values Du, Dv, Dw, according to the command voltages Vu, Vv, Vw of the respective phases output from the controller 30, respectively. According to the duty instruction values Du, Dv, Dw, the PWM controller 20 generates PWM signals for driving the three-phase electric motor M to rotate, and outputs the PWM signals to the high potential-side switching elements Quh, Qvh, Qwh and the low potential-side switching elements Qul, Qvl, Qwl. The PWM signals are input to the gates of the high potential-side switching elements Quh, Qvh, Qwh and the low potential-side switching elements Qul, Qvl, Qwl. The bridge circuit 10 converts power of the battery BAT serving as a DC power supply by using PWM control, and supplies the power to the three-phase electric motor M.

In addition, the controller 30 outputs sampling signals Su, Sv, Sw to the AD converters Tu, Tv, Tw, respectively. The sampling signals Su, Sv, Sw specify timings at which the AD converters Tu, Tv, Tw measure currents. At which timings the AD converters Tu, Tv, Tw measure currents will be described later. The AD converters Tu, Tv, Tw measure the currents of the respective phases according to the sampling signals Su, Sv, Sw and feed back the phase current values Iu, Iv, Iw to the controller 30.

In addition, the polyphase electric motor control device 100 further includes a current-value estimating unit 40. In a case where one phase in which the on time of the PWM signal output to one of the low potential-side switching elements Qul, Qvl, Qwl is shorter than a predetermined time occurs, the current-value estimating unit 40 estimates the phase current value of the phase according to the phase current values of the other two phases. The estimation method is a known method. For example, the phase current value is estimated according to the Kirchhoff's law. In the embodiment, the current-value estimating unit 40 is illustrated as part of the controller 30 of the microcomputer; however, the current-value estimating unit 40 is not limited to this. The current-value estimating unit 40 may be provided in a different microcomputer.

First, with reference to FIGS. 13A and 13B, current detection timings in a typical polyphase electric motor control device will be described.

The sine waves to the phases U, V, W of the three-phase electric motor M are configured of three sine-wave signals having an identical amplitude and phases shifted from each other by 120°. In order to generate the sine-wave signal, the PWM controller 20 compares a PWM reference signal P of a triangle-wave signal having a period extremely shorter than the period of the sine-wave signal, and each of the duty instruction values Du, Dv, Dw corresponding to the command voltages Vu, Vv, Vw which are target values. The PWM controller 20 thus generates a PWM signal for turning on or off each of the high potential-side switching elements Quh, Qvh, Qwh and the low potential-side switching elements Qul, Qvl, Qwl.

Specifically, the PWM controller 20 compares the PWM reference signal P and each of the duty instruction values Du, Dv, Dw. In a section where the PWM reference signal P exceeds each of the duty instruction values Du, Dv, Dw, the PWM controller 20 turns off each of the high potential-side switching elements Quh, Qvh, Qwh, and turns on each of the low potential-side switching elements Qul, Qvl, Qwl corresponding to the high potential-side switching elements Quh, Qvh, Qwh. In contrast, in a section where the PWM reference signal P is below each of the duty instruction values Du, Dv, Dw, the PWM controller 20 turns on each of the high potential-side switching elements Quh, Qvh, Qwh, and turns off the low potential-side switching elements Qul, Qvl, Qwl corresponding to the high potential-side switching elements Quh, Qvh, Qwh. That is, on and off of the high potential-side switching elements Quh, Qvh, Qwh and the low potential-side switching elements Qul, Qvl, Qwl in the phase circuits Cu, Cv, Cw are opposite.

Figure 8:
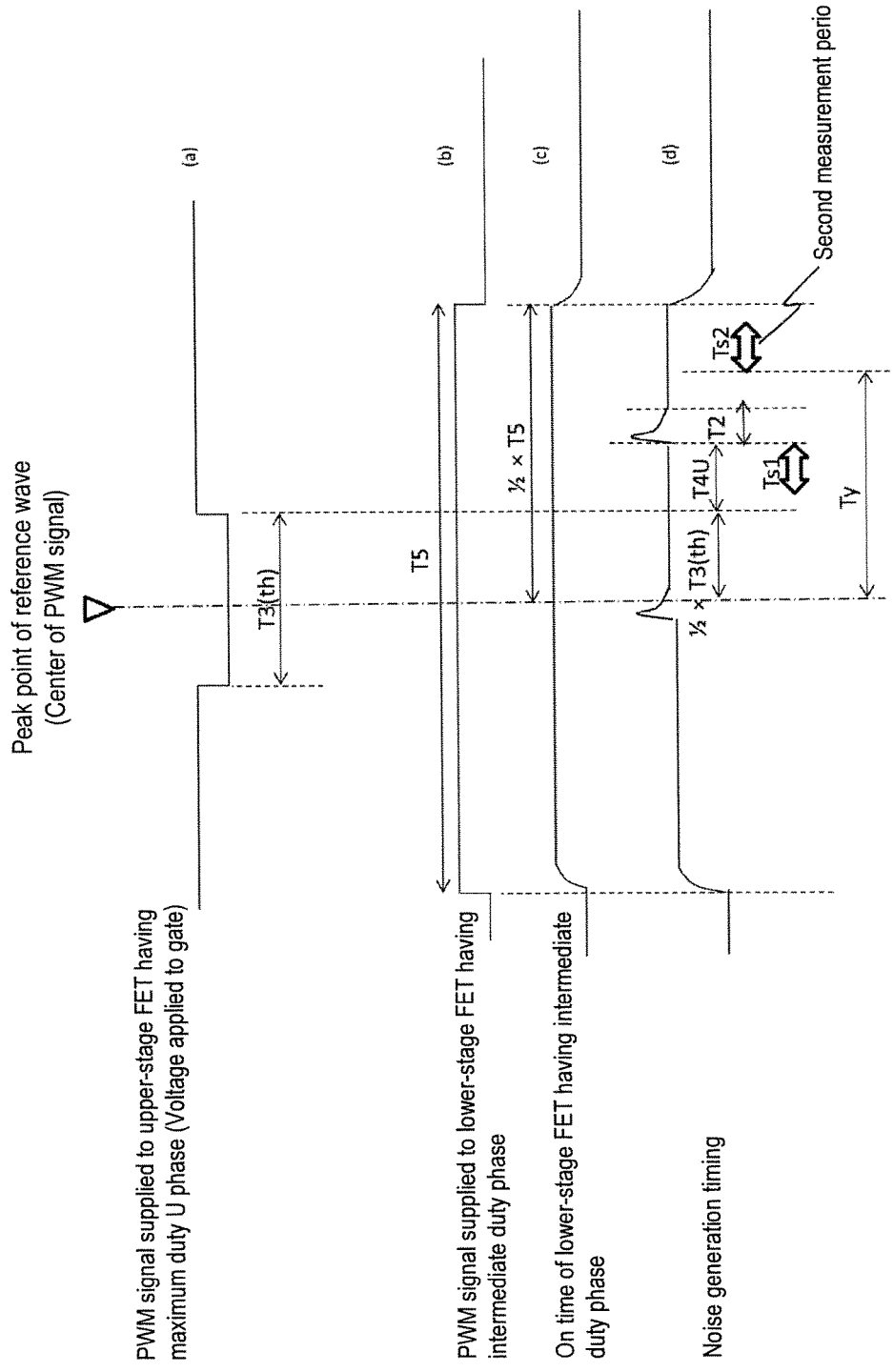
FIG. 8 is an explanatory diagram illustrating a relationship between the PWM signal supplied to the high potential-side switching element (upper-stage FET) having the maximum duty phase and noise generation timings in the intermediate duty phase, and illustrates a second measurement period, in the polyphase electric motor control device according to one or more embodiments of the disclosure.

The current detectors Ru, Rv, Rw are provided on the lower potential side with respect to the low potential-side switching elements Qul, Qvl, Qwl. Therefore, the phase current value of each of the phase circuits Cu, Cv, Cw is detected at the timing when all the low potential-side switching elements Qul, Qvl, Qwl are turned on. That is, as illustrated in FIG. 8 and the like, each of the current detectors Ru, Rv, Rw normally detects the phase current value at a timing synchronized with the vicinity of the top of the triangle-wave signal of the PWM reference signal P. Note that in the embodiment, the PWM reference signal P, which is one triangle-wave signal, is set as one period of the PWM signal, and the top of the triangle-wave signal is set as a center C of the one period of the PWM signal.

As illustrated in FIG. 13A, the phase current values Iu, Iv, Iw which are detected are not square waves in a strict sense. That is, each of the phase current values Iu, Iv, Iw requires a waveform rising time when each of the low potential-side switching elements Qul, Qvl, Qwl is turned on. In addition, each of the phase current values Iu, Iv, Iw requires convergence time from when overshoot occurs and ringing in association with rising of the waveform happens until the ringing converges. Furthermore, each of the phase current values Iu, Iv, Iw requires a waveform falling time when each of the low potential-side switching elements Qul, Qvl, Qwl is turned off. In addition, each of the phase current values Iu, Iv, Iw requires a convergence time from when undershoot occurs and ringing in association with falling of the waveform happens until the ringing converges.

Tb denotes the sum of the time required for such rising of the waveform and the convergence time from when ringing happens until the ringing converges. In addition, Tc denotes the sum of the time required for falling of the waveform and a convergence time from when ringing happens until the ringing converges. Note that the embodiments of the specification illustrate a case where the time during which the low potential-side switching element Qul of the phase circuit Cu is turned on is shortest among the times during which the low potential-side switching elements Qvl, Qwl of the other phase circuits Cv, Cw are turned on. In other words, a description will be given assuming that the phase having the maximum duty is the U phase. Therefore, the time during which the low potential-side switching element Qul is turned on is the time during which all the other low potential-side switching elements Qvl, Qwl are turned on. It goes without saying that the time during which the low potential-side switching element Qul is turned on is not necessarily shortest among the times during which the other low potential-side switching elements Qvl, Qwl are turned on.

As illustrated in FIG. 13A, in order to measure a current, a certain period is actually required. In the specification, Ts denotes the period necessary for current measurement. In a case where the period during which the low potential-side switching element Qul of the phase circuit Cu is turned on is sufficiently longer than the period Ts necessary for current measurement, no current is detected in the time Tb during which the current is not stable, and a stable phase current value with little noise can be measured. As a result, it is possible to reduce the influence of noise on the phase current values of the other phase circuits Cv, Cw.

In contrast, FIG. 13B illustrates a case where the time during which the low potential-side switching element Qul of the phase circuit Cu is turned on is approximately equal to the period Ts necessary for current measurement. In this case, the period Ts necessary for current measurement includes time when the phase current value rises or time when ringing happens. Then, a phase current value including noise caused by rising of the phase current value or the ringing is measured. As a result, noise generated when the low potential-side switching element Qul is turned on within the period Ts necessary for current measurement is mixed in the other phase circuits Cv, Cw. Therefore, when the phase current value including such noise is detected, if the phase current values of the phase circuits Cv, Cw are measured and fed back, the phase current values with which such noise is mixed are fed back to the controller 30. Therefore, appropriate command voltages are not generated, it is impossible to properly drive the three-phase electric motor, and it is impossible to give highly accurate assist force.

Figure 2:
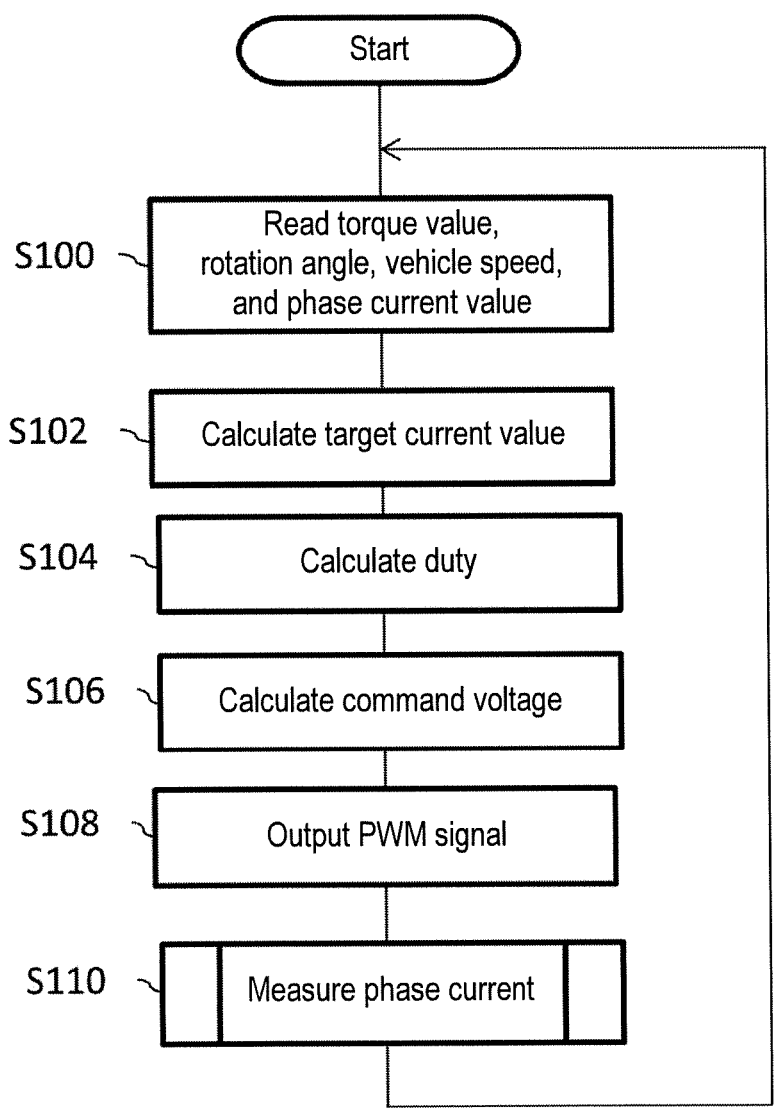
FIG. 2 is a flowchart illustrating a control method of the polyphase electric motor control device according to one or more embodiments of the disclosure.
Figure 3:
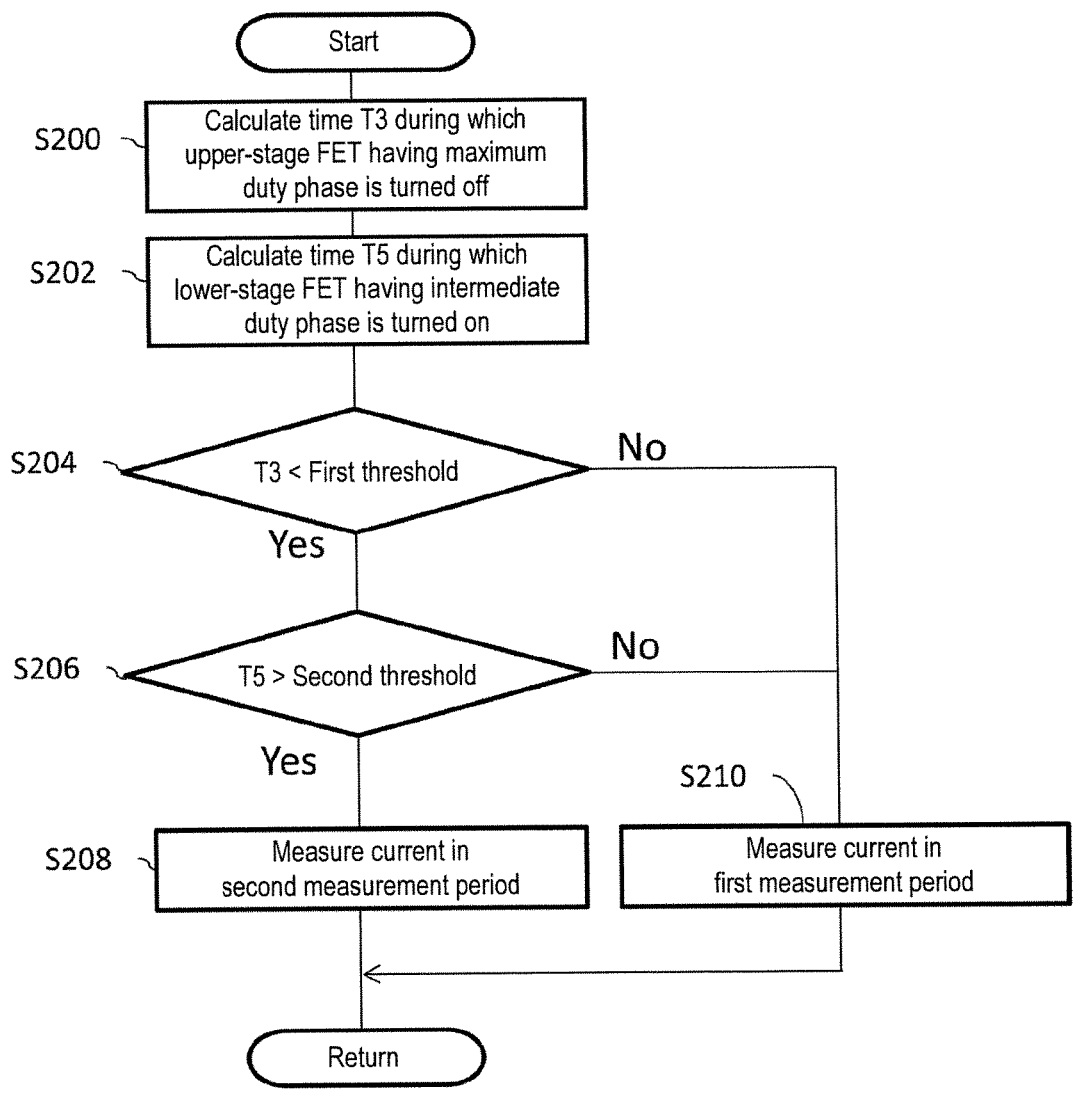
FIG. 3 is a flowchart illustrating a method of measuring a phase current in the polyphase electric motor control device according to one or more embodiments of the disclosure.

With reference to FIG. 2, a control method of the polyphase electric motor control device 100 in the embodiment will be described. Note that S in the flowchart denotes a step. In step S100, the controller 30 of the polyphase electric motor control device 100 reads the phase current values Iu, Iv, Iw output from the AD converters Tu, Tv, Tw, a steering torque value of steering obtained from another sensor or the ECU, a rotation angle of the three-phase electric motor M, and vehicle speed.

In S102, the controller 30 calculates a target current value to be given to steering by the three-phase electric motor M, according to the steering torque value that the driver gives to steering at that vehicle speed, the rotation angle, and the phase current values Iu, Iv, Iw. In S104, the controller 30 calculates duty of each phase generating the target current value. In S106, the controller 30 calculates as a control signal each of the command voltages Vu, Vv, Vw of the respective phases at which the duty occurs.

In S108, the PWM controller 20 generates the duty instruction values Du, Dv, Dw, according to the command voltages Vu, Vv, Vw. According to the duty instruction values Du, Dv, Dw, the PWM controller 20 generates PWM signals for driving the three-phase electric motor M to rotate, and outputs the PWM signals to the high potential-side switching elements Quh, Qvh, Qwh and the low potential-side switching elements Qul, Qvl, Qwl. The PWM signal generated by the PWM controller 20 is switched between an on state and an off state at symmetrical timings with respect to the center of one period of the PWM signal.

In S110, the controller 30 outputs the sampling signals Su, Sv, Sw to the AD converters Tu, Tv, Tw at timings to be described later in order to specify the timings at which the AD converters Tu, Tv, Tw measure currents. The AD converters Tu, Tv, Tw measure currents according to the sampling signals Su, Sv, Sw and feed back the phase current values Iu, Iv, Iw to the controller 30. The controller 30 and the PWM controller 20 repeat S100 to S110 described above. Thus, the three-phase electric motor M applies appropriate assist force to the electric power steering device.

With reference to FIGS. 3 to 10, timings at which the controller 30 causes the AD converters Tu, Tv, Tw to detect currents will be described. That is, timings at which the controller 30 causes the AD converters Tu, Tv, Tw to measure the phase currents of the phase circuits Cu, Cv, Cw will be described. In the description of the embodiment, it is assumed that duty values of the phase circuits Cu, Cv, Cw satisfy Cu>Cv>Cw. It is obvious that the duty values are not limited to them. In S200, the controller 30 calculates a time T3 during which the high potential-side switching element Quh of the phase circuit Cu having maximum duty is turned off (In the drawings, the high potential-side switching element is referred to as an "upper-stage FET".). For example, assuming that one period of the PWM reference signal P is $T_{CL}$, the time T3 is roughly calculated as the product of the duty cycle of the phase circuit Cu and the period $T_{CL}$. In addition, in S202, the controller 30 similarly calculates a time T5 during which the low potential-side switching element Qvl of the phase circuit Cv having intermediate duty, the phase circuit Cv having the second greatest duty cycle, is turned on (In the figures, the low potential-side switching element is referred to as an "lower-stage FET").

Figure 4:
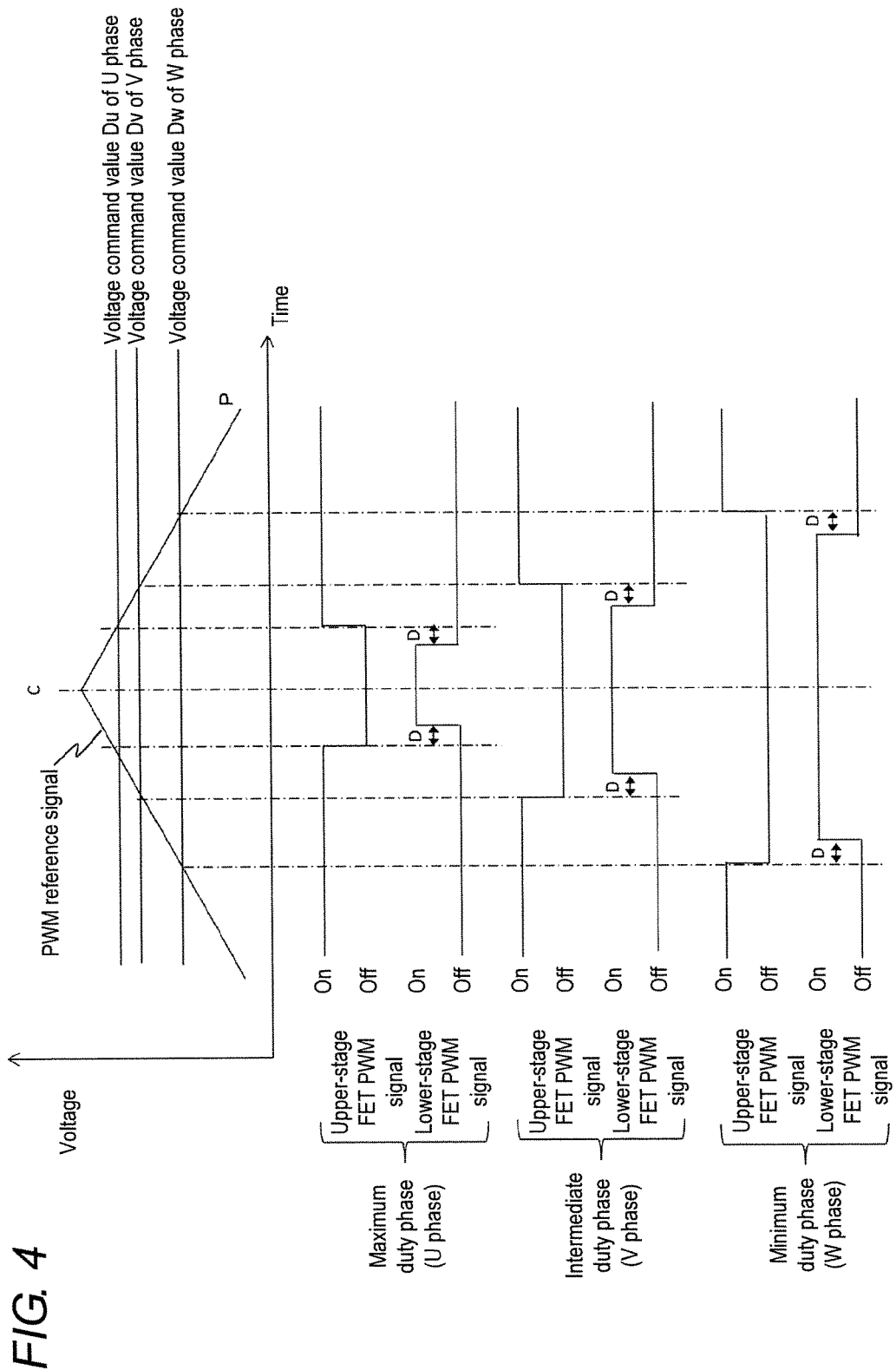
FIG. 4 is an explanatory diagram illustrating switching timings of a PWM signal in a high potential-side switching element (upper-stage FET) and a PWM signal in a low potential-side switching element (lower-stage FET) in the polyphase electric motor control device according to one or more embodiments of the disclosure.

In S204, the controller 30 judges whether or not the time T3 during which the high potential-side switching element Quh is turned off is smaller than a first threshold (first judgment). In order to explain the first threshold, the switching timings of the PWM signal of the high potential-side switching element (upper-stage FET) and the PWM signal of the low potential-side switching element (lower-stage FET) will be described with reference to FIGS. 4 to 7. As illustrated in FIG. 4, switching on and off of the PWM signal to each of the phase circuits Cu, Cv, Cw are basically performed at symmetrical timings with respect to the top of the triangle-wave signal of the PWM reference signal P, that is, the center C of one period of the PWM signal.

In the phase circuit Cu (U phase) having the maximum duty, the low potential-side switching element Qul (lower-stage FET) is switched from off to on slightly after the timing at which the high potential-side switching element Quh (upper-stage FET) is switched from on to off. In addition, in a case where duty is not great, the high potential-side switching element Quh is switched from off to on slightly after the timing at which the low potential-side switching element Qul is switched from on to off. This slight delay time is referred to as a dead time D. The dead time D is provided in order to prevent a short circuit of the phase circuit Cu since the phase circuit Cu is short-circuited if there is a time during which the high potential-side switching element Quh and the low potential-side switching element Qul are switched on simultaneously. The dead time D is also provided in the phase circuit Cw having the minimum duty cycle and the phase circuit Cv having the intermediate duty cycle between the duty cycles of the phase circuit Cu and the phase circuit Cw. Note that if duty of the phase circuit Cu having the maximum duty increases to nearly 100%, the low potential-side switching elements Qvl, Qwl (lower-stage FETs) are remained to be switched off because of the dead time D or the like. The following description of the embodiment will illustrate a case of duty at which the lower-stage FET of the maximum duty phase is not switched on.

Figure 5:
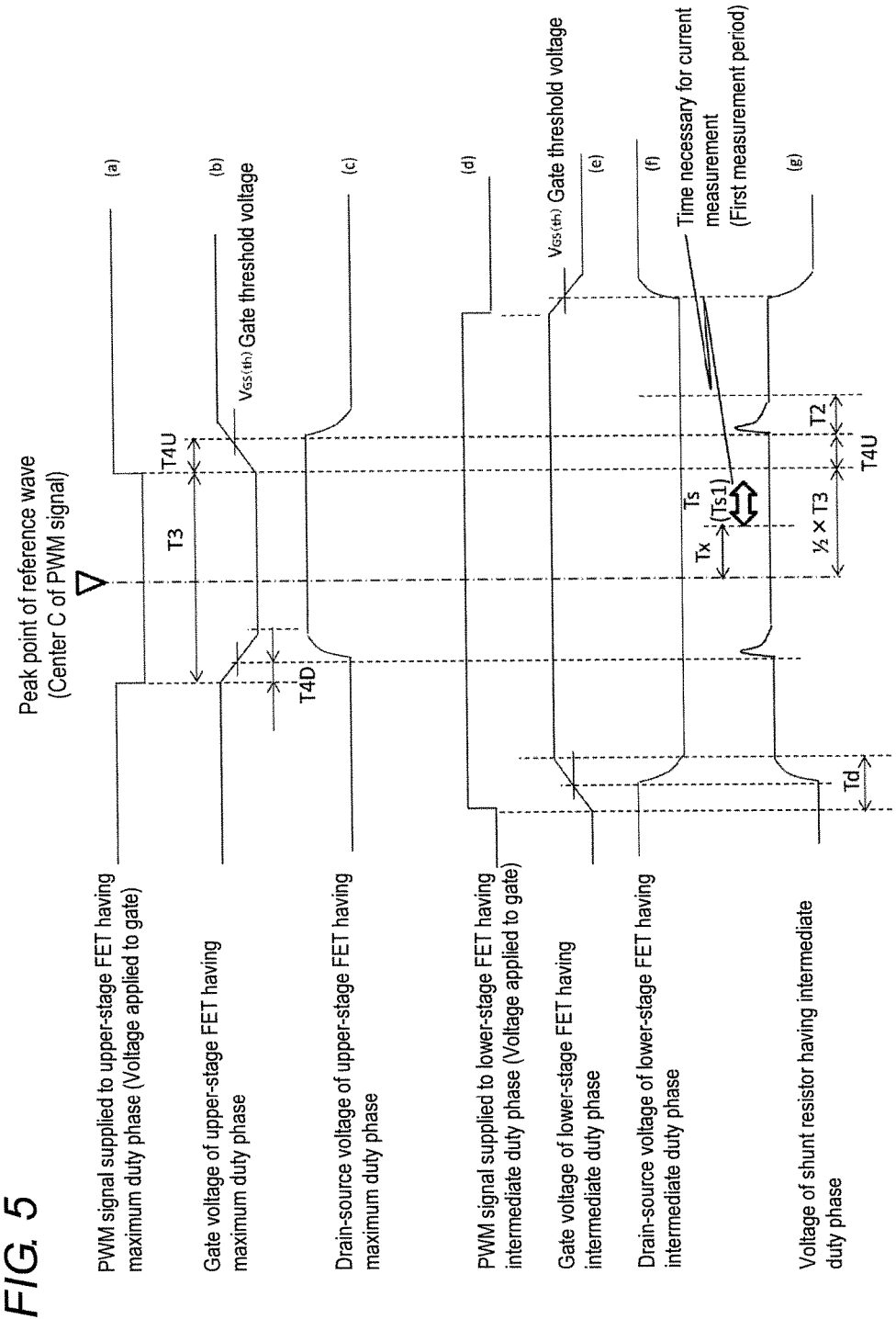
FIG. 5 is an explanatory diagram explaining a relationship among a PWM signal, a gate voltage, and a drain-source voltage, and illustrates a first measurement period, in the polyphase electric motor control device according to one or more embodiments of the disclosure.

With reference to FIG. 5, the relationship among the PWM signal, a gate voltage, and a drain-source voltage will be described. It has been described that the PWM signal is switched on and off at symmetrical timings with respect to the center C of one period of the PWM signal. However, since the PWM signal is a voltage applied to the gate of the switching element, the switching element is switched on and off when the voltage of the PWM signal reaches a gate threshold voltage $V_{GS(th)}$. Then, as shown with a line (c) in FIG. 5, the drain-source voltage of the high potential-side switching element Quh (upper-stage FET) of the phase circuit Cu having the maximum duty starts to rise and fall slightly after the on and off timings of the PWM signal. Noise generated upon switching of the switching element is generated not at the on and off timings of the PWM signal but at a timing slightly delayed from the on or off timing of the PWM signal, that is, the timing at which the gate voltage passes through the gate threshold voltage $V_{GS(th)}$. Note that the gate threshold voltage $V_{GS(th)}$ is a constant determined by the switching element that includes the gate. A time T4D taken for the gate voltage to reach the gate threshold voltage $V_{GS(th)}$ after the PWM signal is applied to the gate is determined by the capacitance that the switching element which includes the gate and the circuit has, or the like.

The noise affects the circuit of another phase, for example, the phase circuit Cv having the intermediate duty cycle, slightly after the on and off timings of the PWM signal. As shown with a line (g) in FIG. 5, noise (left wave) starts to affect the current detector Rv of the phase circuit Cv when the gate voltage of the high potential-side switching element Quh in the phase circuit Cu having the maximum duty becomes lower than the threshold voltage $V_{GS(th)}$. The current detector Rv measures a current of which ringing happens for a while and then converges, during the period Ts necessary for current measurement. In addition, noise (right wave) starts to affect the current detector Rv when the gate voltage of the high potential-side switching element Quh exceeds the threshold voltage $V_{GS(th)}$. The current detector Rv measures a current of which ringing happens for a while and then converges, during the period Ts necessary for current measurement.

Note that T4D denotes a time from when the PWM signal is switched from on to off until the gate voltage reaches the gate threshold voltage $V_{GS(th)}$. T4U denotes a time from when the PWM signal is switched from off to on until the PWM signal reaches the gate threshold voltage $V_{GS(th)}$. T2 denotes a time from an occurrence of noise to convergence of ringing. Td denotes a time from when the voltage (PWM signal) applied to the gate of the low potential-side switching element Qvl of the phase circuit Cv having the intermediate duty is switched from off to on until the drain-source voltage stabilizes.

Two periods in which the controller 30 uses the current detectors Ru, Rv, Rw to measure the currents of the respective phases will be described below (A first measurement period Ts1 and a second measurement period Ts2 in which measurement is started after the first measurement period Ts1). In the first measurement period Ts1, start of current measurement is delayed by a time Tx (first measurement start delay time or delay time) from the center C of the PWM signal. In the second measurement period Ts2, start of current measurement is delayed by a time Ty (second measurement start delay time or delay time) from the center C. In a case where the time T3 during which the high potential-side switching element Quh in the phase circuit Cu having the maximum duty is switched off is relatively long, as shown with a line (g) in FIG. 5, the period Ts necessary for current measurement is terminated before noise (right wave) occurs, the noise being generated when the gate voltage of the high potential-side switching element Quh exceeds the threshold voltage $V_{GS(th)}$. That is, the relationship Ts1<T3/2+T4U−Tx is satisfied. As described above, in the first measurement period Ts1, a current is measured in a period between the center C of the PWM signal and time when the noise (right wave) is generated, the noise being generated when the gate voltage of the high potential-side switching element Quh exceeds the threshold voltage $V_{GS(th)}$ and the PWM signal is switched from off to on. In this case, the controller 30 at least outputs the sampling signals Sv, Sw to the AD converters Tv, Tw in the first measurement period Ts1. The AD converters Tv, Tw measure currents according to the sampling signals Sv, Sw, and feed back the phase current values Iv, Iw to the controller 30. According to the phase current values Iv, Iw, the current-value estimating unit 40 estimates the phase current value Iu of the phase circuit Cu. In this manner, it is possible to measure the phase current while reducing the influence of noise generated upon switching of the switching element.

Figure 6:
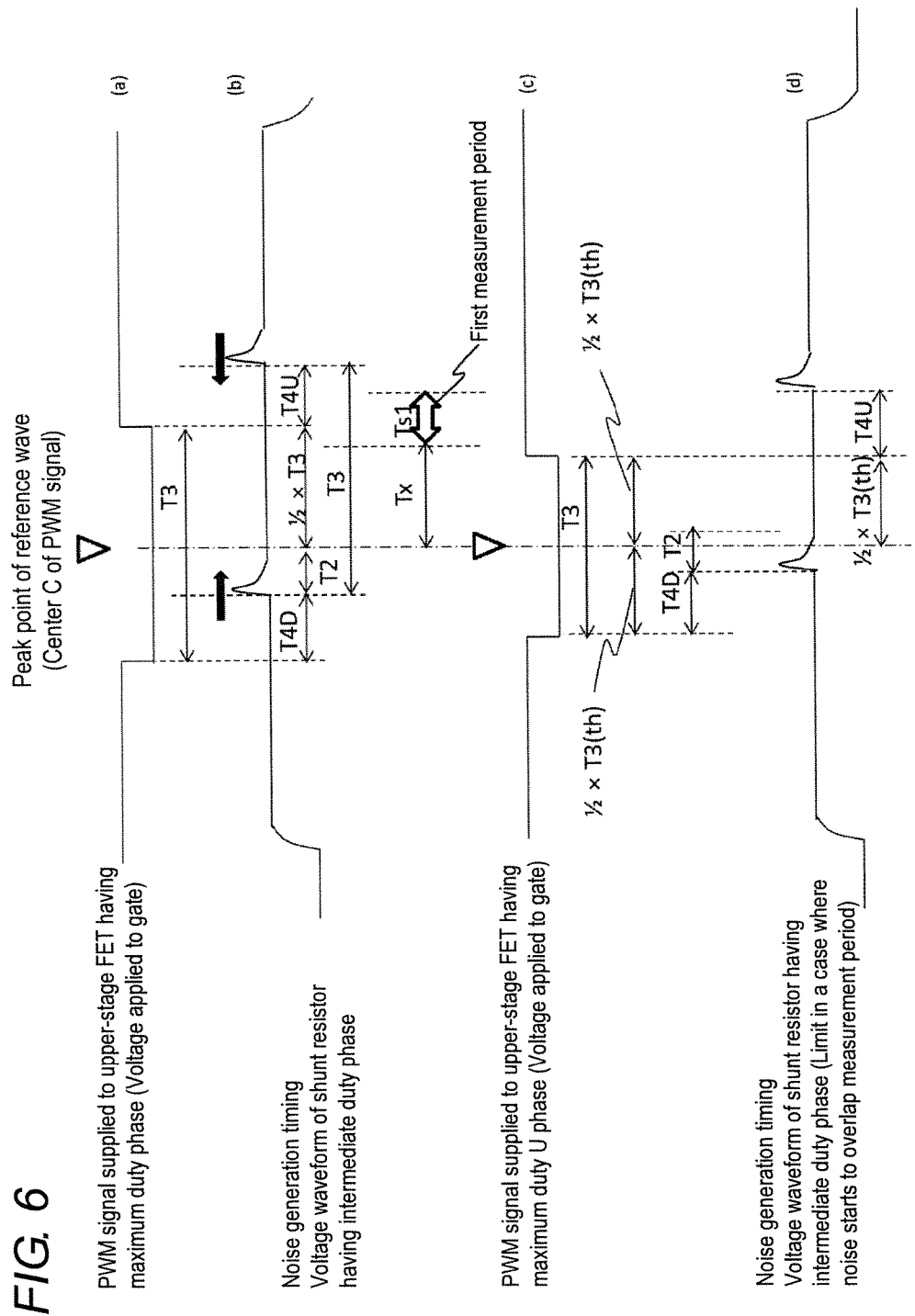
FIG. 6 is an explanatory diagram explaining a relationship between the PWM signal supplied to the high potential-side switching element (upper-stage FET) having a maximum duty phase and noise generation timings in an intermediate duty phase, and illustrates a first threshold, in the polyphase electric motor control device according to one or more embodiments of the disclosure.
Figure 7:
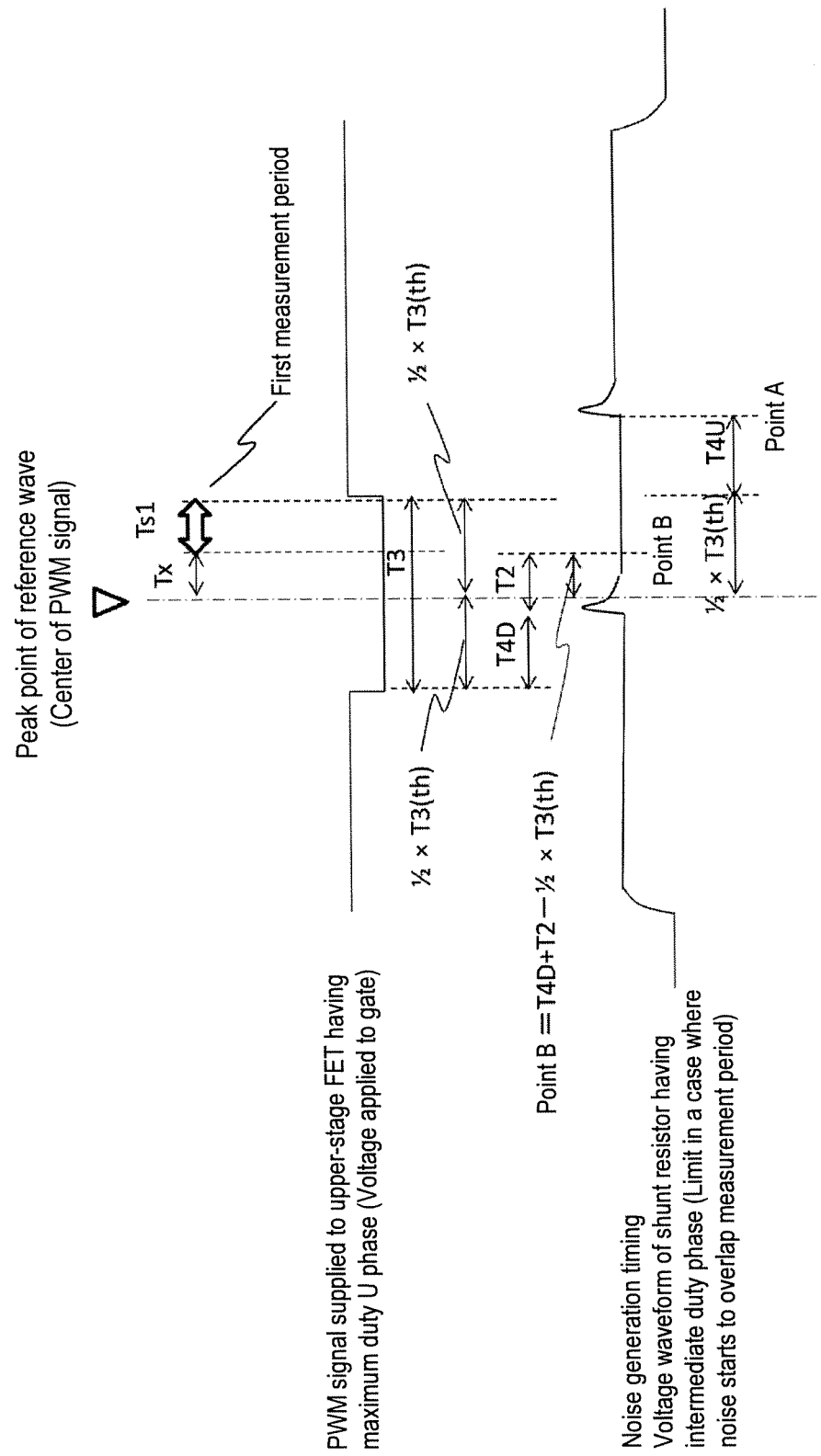
FIG. 7 is an explanatory diagram illustrating a case where a first measurement start delay time is shorter than that in FIG. 6.

However, as shown with a line (b) in FIG. 6, if the time T3 during which the high potential-side switching element Quh in the phase circuit Cu having the maximum duty is switched off is shorter, noise (right wave) generated when the gate voltage of the high potential-side switching element Quh exceeds the threshold voltage $V_{GS(th)}$ approaches the center C of the PWM signal. Therefore, the period Ts necessary for current measurement is not terminated before the noise (right wave) starts to be generated. Then, the first measurement period Ts1 cannot be secured, and the AD converters Tv, Tw feed back the phase current values Iv, Iw including the noise (right wave) to the controller 30.

Lines (c) and (d) in FIG. 6 illustrate the limit value of T3 (first threshold: $T3_{(th)}$) in a case where the period Ts necessary for current measurement is terminated before the noise (right wave) starts to be generated. Therefore, as shown with a line (d) in FIG. 6 illustrates, the first threshold $T3_{(th)}$ is the value $T3_{(th)}$ of T3 which satisfies the relationship Ts1+Tx=T3/2+T4U. That is, $T3_{(th)}=2*(Ts1+Tx−T4U)$. Note that the first measurement period Ts1 is delayed by the time Tx from the center C of the PWM signal because the fact that the noise is generated slightly after the change in the PWM signal is taken into consideration. If the time T3 during which the high potential-side switching element Quh in the phase circuit Cu having the maximum duty is switched off exceeds the first threshold $T3_{(th)}$, the noise starts to overlap the first measurement period Ts1. Note that the controller 30 may store the first threshold $T3_{(th)}$.

In S204, the controller 30 judges whether or not the time T3 during which the high potential-side switching element Quh is turned off is smaller than the first threshold ($T3_{(th)}$). In a case where the time T3 is greater than the first threshold, the controller 30 measures a current in the first measurement period Ts1 in S210. In a case where the time T3 is less than or equal to the first threshold, the controller 30 judges in S206 whether or not the time T5 during which the low potential-side switching element Qvl of the phase circuit Cv having the intermediate duty is turned on is greater than a second threshold (second judgment).

Note that a case where the first measurement start delay time Tx is relatively longer has been described. That is, with reference to FIG. 7, in the above case, the first measurement period Ts1 which starts with a delay of the first measurement start delay time Tx from the center C overlaps the time (point A in FIG. 7) when right noise starts to be generated before the first measurement period Ts1 overlaps the convergence time (point B in FIG. 7) of left noise. However, in a case where the first measurement start delay time Tx is shorter, that is, in a case where the first measurement period Ts1 starts without being delayed much from the center C of the PWM signal, left noise overlaps the first measurement period Ts1 before right noise overlaps. In this case, it is assumed that the time T3 when the left noise starts to overlap the first measurement period Ts1 before the right noise overlaps is the first threshold $T3_{(th)}$.

Figure 9:
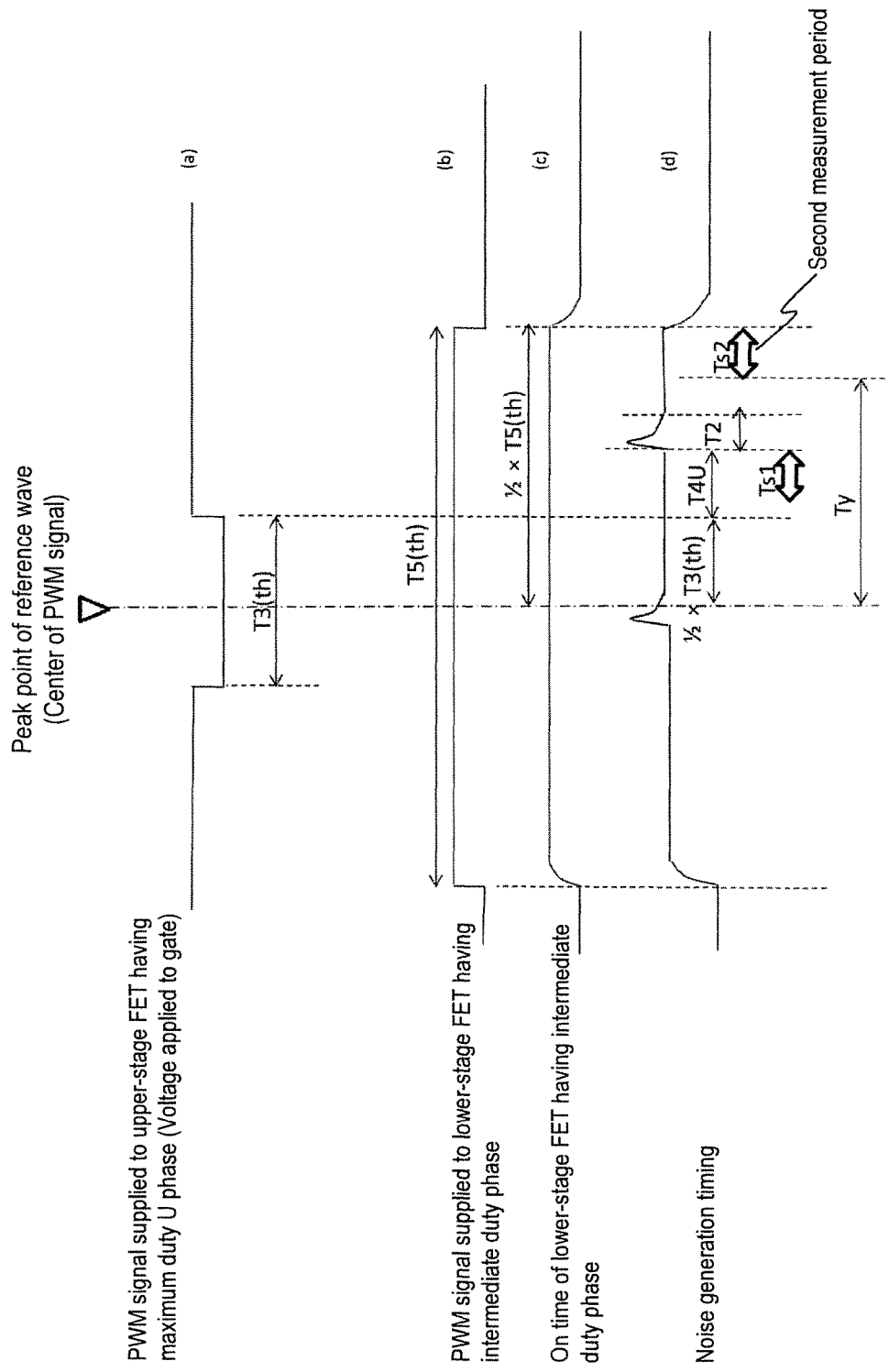
FIG. 9 is an explanatory diagram explaining a relationship between the PWM signal supplied to the high potential-side switching element (upper-stage FET) having the maximum duty phase and noise generation timings in the intermediate duty phase, and illustrates a second threshold, in the polyphase electric motor control device according to one or more embodiments of the disclosure.
Figure 10:
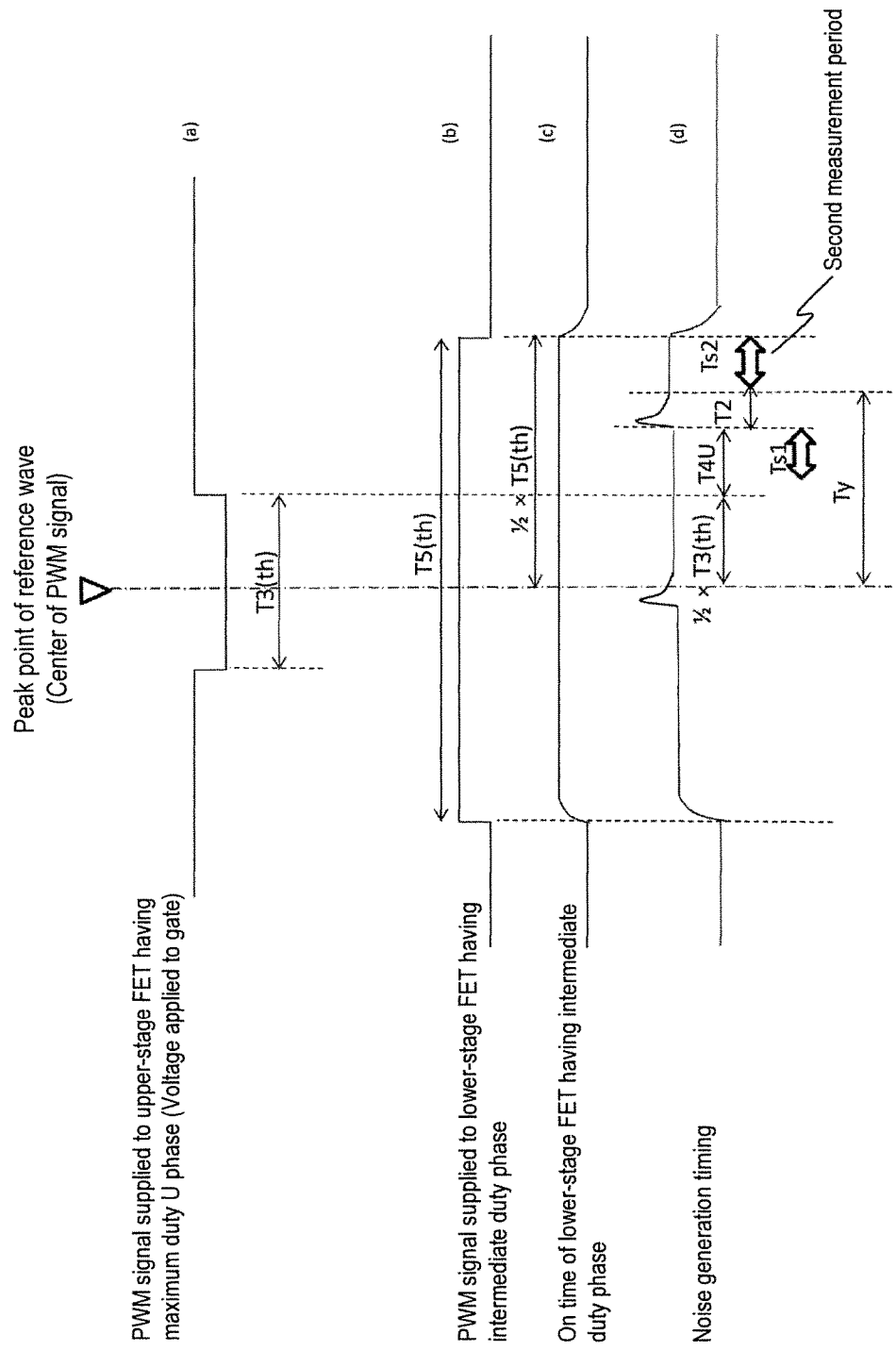
FIG. 10 is an explanatory diagram illustrating a case where a second measurement start delay time is set to an optimal value in FIGS. 9A to 9D.

With reference to FIGS. 8 to 10, the second threshold will be described. In a case where the time T3 during which the high potential-side switching element Quh is turned off is less than or equal to the first threshold ($T3_{(th)}$), the controller 30 cannot measure a current in the first measurement period Ts1. Therefore, the controller 30 measures a current on or after the time T2 from the generation of noise (right wave) generated when the gate voltage of the high potential-side switching element Quh exceeds the threshold voltage $V_{GS(th)}$ until ringing converges. That is, as shown with a line (d) in FIG. 8, if the controller 30 starts current measurement on or after the second measurement start delay time Ty which is delayed by $T3_{(th)}/2+T4U+T2$ or greater from the center C of the PWM signal, the controller 30 can measure a current without noise (right wave).

In contrast, in a case where current measurement is started after the noise (right wave) converges, it is necessary to finish the current measurement of the phase circuit Cv having the intermediate duty within the time T5 during which the low potential-side switching element Qvl is turned on. This is because it is necessary to detect the phase current value of the phase circuit Cv at the timing when the low potential-side switching element Qvl is turned on. As described, in a case where the controller 30 cannot measure a current in the first measurement period Ts1, the controller 30 measures a phase current of the phase circuit Cv in the second measurement period Ts2, which is a period between time when the noise (right wave) converges and time when the low potential-side switching element Qvl is turned from on to off.

In order for the phase current of the phase circuit Cv having the intermediate duty to be measured in the second measurement period Ts2, the time T5 during which the low potential-side switching element Qvl is turned on needs to satisfy T5/2>Ty+Ts2, as shown with lines (c) and (d) in FIG. 9. That is, T5 must be greater than 2 (Ty+Ts2) in order for the low potential-side switching element Qvl to be switched from on to off after the end of the second measurement period Ts2. The value of T5 in this case is a second threshold (T5$_{(th)}$). Note the controller 30 may store the second threshold (T5$_{(th)}$).

As shown with a line (d) in FIG. 10, the second threshold T5$_{(th)}$ is preferably set such that the second measurement start delay time Ty ends immediately after convergence of right noise generated in a case where the time T3 during which the high potential-side switching element Quh in the phase circuit Cu having the maximum duty is turned off is the first threshold T3$_{(th)}$. Specifically, Ty=T3$_{(th)}$/2+T4U+T2. That is, it is preferable that the start time of the second measurement period Ts2 (time when the second measurement start delay time Ty has passed) is a time point at which noise converges, the noise being generated when the high potential-side switching element Quh of the phase circuit is switched from off to on in a case where the phase circuit is driven in a state where the time T3 during which the high potential-side switching element Quh is turned off is set to the first threshold T3$_{(th)}$. According to this, the second threshold T5$_{(th)}$ can be minimized. Therefore, in the possible range of time T5 during which the low potential-side switching element Qvl is turned on, it is possible to maximize the range in which a current can be measured in the second measurement period Ts2 without overlapping noise.

In step S206, the controller 30 checks whether or not the time T5 during which the low potential-side switching element Qvl is turned on is greater than the second threshold (T5$_{(th)}$). In a case where the time T5 is greater than the second threshold (T5$_{(th)}$), the controller 30 measures the current in the second measurement period Ts2 in S208. In this case, the controller 30 outputs the sampling signals Sv, Sw to the AD converters Tv, Tw in the second measurement period Ts2. The AD converters Tv, Tw detect currents according to the sampling signals Sv, Sw, and feed back the phase current values Iv, Iw to the controller 30. In this manner, it is possible to measure the phase current while reducing the influence of noise generated upon switching of the switching element.

In a case where the time T5 during which the low potential-side switching element Qvl is turned on is less than or equal to the second threshold (T5$_{(th)}$) in S206, the controller 30 measures the current in the first measurement period Ts1 in S210. In this case, there is a possibility that noise generated by switching of the phase circuit Cu having the maximum duty is mixed in the phase current to be detected of the phase circuit Cv having the intermediate duty cycle. The reason why the controller 30 measures the current in the first measurement period Ts1 is that the phase current of the phase circuit Cv having the intermediate duty cycle cannot be detected at all in the second measurement period on or after the low potential-side switching element Qvl is turned off.

As described above, in a case where the period for measuring the current flowing through the current detector Rv of the phase circuit Cv having the second greatest duty cycle is terminated before the time point when noise is generated in the phase circuit Cv having the second greatest duty cycle, the noise being generated due to switching on of the high potential-side switching element Quh of the phase circuit Cu having the maximum duty cycle among the duty cycles that the PWM controller 20 calculates, the controller 30 measures the current in the first measurement period Ts1 which starts with a delay of a predetermined time (Td) from the center C of one period of the PWM signal. In a case where the period for measuring the current is not terminated, if the period for measuring the current is terminated before the time point when the low potential-side switching element Qvl of the phase circuit Cv having the second greatest duty cycle is turned off, the controller 30 measures the current in the second measurement period Ts2 in which measurement is started after noise converges.

That is, the controller 30 stores the first threshold and the second threshold. The first threshold is an off time of the high potential-side switching element Quh of the phase circuit Cu having the maximum target duty cycle among the target duty cycles. At the first threshold, switching noise generated by the high potential-side switching element Quh starts to overlap the first measurement period Ts1. The second threshold is on time of the low potential-side switching element Qvl of the phase circuit Cv having the second greatest target duty cycle among the target duty cycles. At the second threshold, the time when the low potential-side switching element Qvl is switched from on to off is after an end of the second measurement period Ts2. The controller 30 makes the first judgment and the second judgment. The first judgment is for comparing the off time of the high potential-side switching element Quh of the phase circuit Cu having the maximum target duty cycle with the first threshold. The second judgment is for comparing the on time of the low potential-side switching element Qvl of the phase circuit Cv having the second greatest target duty cycle with the second threshold. In a case where the result of the first judgment indicates that the off time of the high potential-side switching element Quh of the phase circuit Cu having the maximum target duty cycle is greater than or equal to the first threshold, the controller 30 measures the current in the first measurement period Ts1. In a case where the result of the first judgment indicates the off time of the high potential-side switching element Quh of the phase circuit Cu having the maximum target duty cycle is smaller than the first threshold and the result of the second judgment indicates that the low potential-side switching element Qvl of the phase circuit Cv having the second greatest target duty cycle is greater than the second threshold, the controller 30 measures the current in the second measurement period Ts2. According to this, by measuring the current flowing through the phase circuit while avoiding noise generated in the phase circuit Cv having the second greatest duty cycle due to switching of the switching element in the phase circuit Cu having the maximum duty cycle, it is possible to provide the polyphase electric motor control device 100 that measures the phase current while reducing the influence of noise generated upon switching of the switching element.

Second Embodiment

Figure 11:
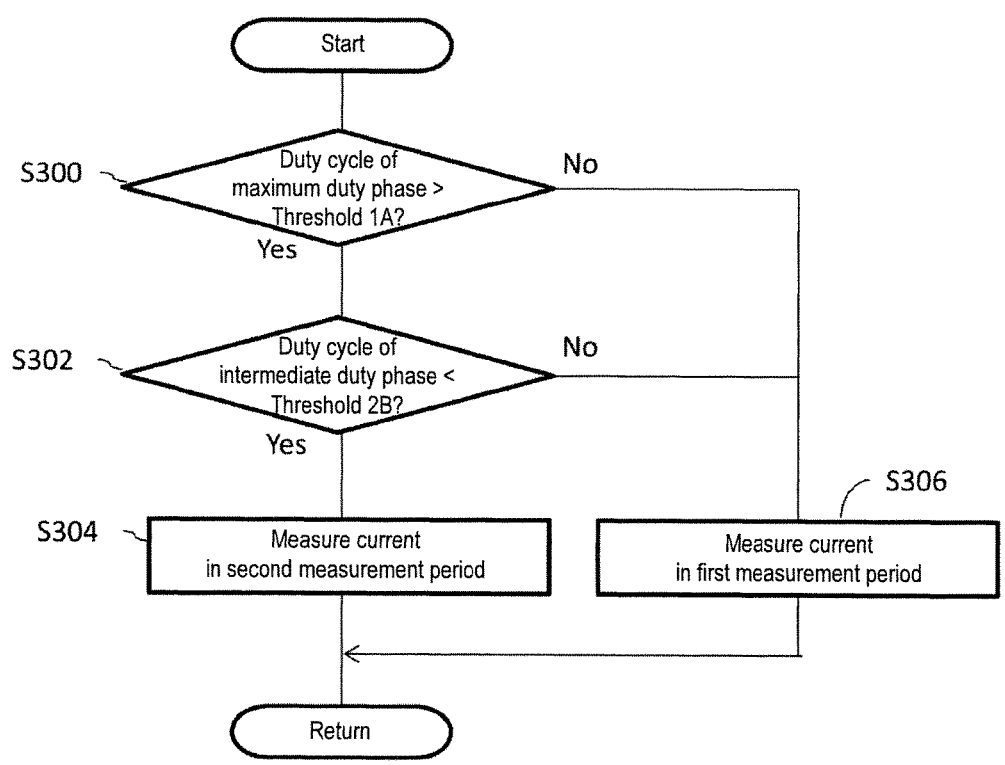
FIG. 11 is a flowchart illustrating a method of measuring a phase current in a polyphase electric motor control device according to one or more embodiments of the disclosure.

With reference to FIG. 11, timings for measuring phase currents of phase circuits Cu, Cv, Cw of a polyphase electric motor control device according to this embodiment will be described. In order to avoid repeated description, points of difference from the above embodiment will be mainly described. FIG. 11 corresponds to FIG. 3 in the above-described embodiment. In addition, the description will be given assuming that duty values of the phase circuits Cu, Cv, Cw satisfy Cu>Cv>Cw.

In S300, a controller 30 judges whether or not the duty cycle of the phase circuit Cu having the maximum duty is greater than a threshold 1A (first judgment). The threshold 1A refers to time (time T3) during which a high potential-side switching element Quh of the phase circuit Cu is turned off. In other words, the threshold 1A refers to the duty cycle corresponding to the limit value (first threshold T3$_{(th)}$) in a case where a period (Ts in the above-described embodiment) necessary for measuring the current of the phase circuit Cu is terminated before noise of a right wave starts to be generated. That is, the threshold 1A is a duty cycle at which switching noise generated by the high potential-side switching element Quh of the phase circuit Cu starts to overlap a first measurement period.

In a case where the duty cycle of the phase circuit Cu having the maximum duty is less than or equal to the threshold 1A in the first judgment, the controller 30 measures in S306 the current in the first measurement period Ts1 in which measurement of the current of the phase circuit Cu is terminated before the noise of the right wave starts to be generated. In a case where the duty cycle of the phase circuit Cu is greater than the threshold 1A, the controller 30 judges in S302 whether or not the duty cycle of the phase circuit Cv having the intermediate duty is less than a threshold 2B (second judgment). The threshold 2B is a time (T5) during which a low potential-side switching element Qvl of the phase circuit Cv having the intermediate duty is turned on. In other words, the threshold 2B refers to a duty cycle corresponding to the limit value (second threshold ($T5_{(th)}$)) in a case where a period (Ts2) necessary for measuring the current of the phase circuit Cv is terminated before the low potential-side switching element Qvl is turned from on to off. That is, the threshold 2B is a duty cycle at which the time when the low potential-side switching element Qvl of the phase circuit Cv is switched from on to off is after an end of a second measurement period.

In a case where the duty cycle of the phase circuit Cv having the intermediate duty is less than the threshold 2B in S302, the controller 30 measures the current in the second measurement period Ts2 in S304. In a case where the duty cycle of the phase circuit Cv having the intermediate duty is greater than or equal to the threshold 2B, the controller 30 measures the current in the first measurement period Ts1 in S306.

As described above, the controller 30 stores the first threshold and the second threshold. The first threshold is a duty cycle at which switching noise generated by the high potential-side switching element of the phase circuit starts to overlap the first measurement period. The second threshold is a duty cycle at which the time when the low potential-side switching element of the phase circuit is switched from on to off is after the end of the second measurement period. The controller 30 makes the first judgment and the second judgment. The first judgment is for comparing the maximum target duty cycle among the target duty cycles with the first threshold. The second judgment is for comparing the second greatest target duty cycle among the target duty cycles with the second threshold. In a case where the result of the first judgment indicates that the maximum target duty cycle is smaller than the first threshold, the controller 30 measures the current in the first measurement period. In a case where the result of the first judgment indicates that the maximum target duty cycle is greater than the first threshold and the result of the second judgment indicates that the second greatest target duty cycle is smaller than the second threshold, the controller 30 measures the current in the second measurement period. According to this, by measuring the current flowing through the phase circuit while avoiding noise generated in the phase circuit Cv having the second greatest duty cycle, the noise being generated due to switching of the switching element in the phase circuit Cu having the maximum duty cycle, it is possible to provide the polyphase electric motor control device that measures a phase current while reducing the influence of noise generated upon switching of the switching element.

Third Embodiment

Figure 12:
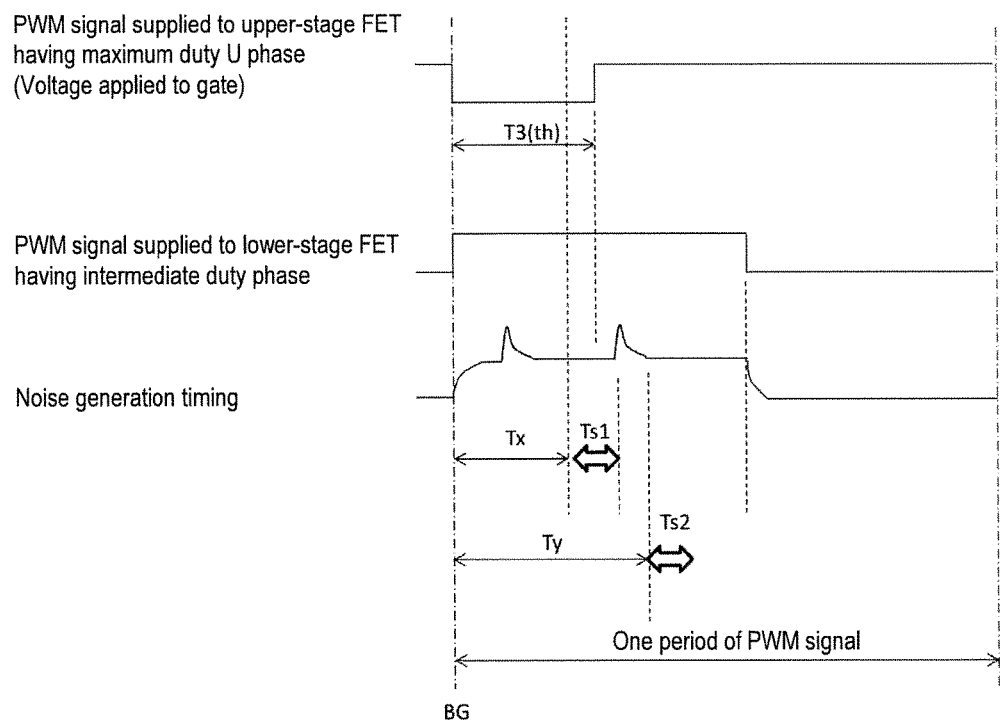
FIG. 12 is an explanatory diagram illustrating a PWM signal in a polyphase electric motor control device according to one or more embodiments of the disclosure.

With reference to FIG. 12, a polyphase electric motor control device according to this embodiment will be described. In the above-described embodiments, switching on and off of the PWM signal to each of the phase circuits Cu, Cv, Cw are basically performed at symmetrical timings with respect to the center C of one period of the PWM signal, which is the top of a triangle-wave signal. The embodiment illustrates a case where switching on and off timings of the PWM signals of respective phases are aligned at the start points (left ends) of one period each PWM signal. In a first measurement period Ts1, start of current measurement is delayed by a first measurement start delay time Tx from a start point BG of the PWM signal. In a second measurement period Ts2, start of current measurement is delayed by a second measurement start delay time Ty from the start point BG.

In this manner, a similar polyphase electric motor control device can be provided also by setting the measurement time of each phase using the start point of one period of the PWM signal of each phase as a reference.

Note that the disclosure is not limited to the embodiments described as examples, and can be implemented in a configuration within the scope not departing from the contents described in the respective claims. While the disclosure has been particularly illustrated and described mainly with reference to particular embodiments, those skilled in the art can make various changes in quantity and another detailed configuration to the above embodiments without departing from the technical ideas and the scope of the disclosure.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A polyphase electric motor control device controlling a polyphase electric motor, the polyphase electric motor control device comprising:
    a bridge circuit configured by connecting in parallel phase circuits corresponding to each phase of the polyphase electric motor, each of the phase circuits including in series a high potential-side switching element, a low potential-side switching element, and a current detector provided on a low-potential side with respect to the low potential-side switching element and configured to detect a phase current value;
    a controller configured to measure a current flowing through the current detector in one of a first measurement period and a second measurement period in which measurement is started later than the first measurement period and configured to calculate a control signal for controlling a current fed to each of the phase circuits; and
    a PWM controller configured to periodically calculate a target duty cycle of a PWM signal for driving each of the low potential-side switching element and the high potential-side switching element, the target duty cycle being calculated according to the control signal, and stored for comparison,
    wherein the controller is configured to store a first threshold which is a duty cycle at which switching noise caused by the high potential-side switching element of each of the phase circuits starts to overlap the first measurement period, and a second threshold which is a duty cycle at which time when the low potential-side switching element of each of the phase circuits is switched from on to off is after an end of the second measurement period, configured to make a first judgment for comparing a maximum target duty cycle among the target duty cycles with the first threshold, and a second judgment for comparing a second greatest target duty cycle among the target duty cycles with the second threshold, configured to measure the current in the first measurement period when a result of the first judgment indicates that the maximum target duty cycle is smaller than the first threshold, and configured to measure the current in the second measurement period when a result of the first judgment indicates that the maximum target duty cycle is greater than the first threshold and a result of the second judgment indicates that the second greatest target duty cycle is smaller than the second threshold.

2. The polyphase electric motor control device according to claim 1, wherein a start time of the second measurement period is a time point at which noise converges, the noise being generated upon switching from off to on of the high potential-side switching element of the phase circuit when the phase circuit is driven at a duty cycle of the first threshold.

3. The polyphase electric motor control device according to claim 1, wherein a start time of the first measurement period is delayed by a predetermined delay time from a center of the PWM signal.

4. A polyphase electric motor control device controlling a polyphase electric motor, the polyphase electric motor control device comprising:

a bridge circuit configured by connecting in parallel phase circuits corresponding to each phase of the polyphase electric motor, each of the phase circuits including in series a high potential-side switching element, a low potential-side switching element, and a current detector provided on a low-potential side with respect to the low potential-side switching element and configured to detect a phase current value;

a controller configured to measure a current flowing through the current detector in one of a first measurement period and a second measurement period in which measurement is started later than the first measurement period and configured to calculate a control signal for controlling a current fed to each of the phase circuits; and a PWM controller configured to periodically calculate a target duty cycle of a PWM signal for driving each of the low potential-side switching element and the high potential-side switching element, the target duty cycle being calculated according to the control signal, and stored for comparison, wherein the controller is configured to store a first threshold which is an off time of the high potential-side switching element of the phase circuit having a maximum target duty cycle among the target duty cycles in a case where switching noise caused by the high potential-side switching element of the phase circuit having the maximum target duty cycle starts to overlap the first measurement period, and a second threshold which is an on time of the low potential-side switching element of the phase circuit having a second greatest target duty cycle among the target duty cycles in a case where the low potential-side switching element of the phase circuit having the second greatest target duty cycle is switched from on to off is after an end of the second measurement period, configured to make a first judgment for comparing an off time of the high potential-side switching element of the phase circuit having a maximum target duty cycle among the target duty cycles with the first threshold, and a second judgment for comparing the on time of the low potential-side switching element of the phase circuit having the second greatest target duty cycle among the target duty cycles with the second threshold, configured to measure the current in the first measurement period when a result of the first judgment indicates that the off time of the high potential-side switching element of the phase circuit having the maximum target duty cycle is not smaller than the first threshold, and configured to measure the current in the second measurement period when a result of the first judgment indicates that the off time of the high potential-side switching element of the phase circuit having the maximum target duty cycle is smaller than the first threshold and a result of the second judgment indicates that the on time of the low potential-side switching element of the phase circuit having the second greatest target duty cycle is greater than the second threshold.

5. The polyphase electric motor control device according to claim 2, wherein a start time of the first measurement period is delayed by a predetermined delay time from a center of the PWM signal.

* * * * *